(12) United States Patent
Parks

(10) Patent No.: US 11,993,361 B2
(45) Date of Patent: May 28, 2024

(54) UPPER SURFACE LOUVERS FOR LIFT FANS

(71) Applicant: Aurora Flight Sciences Corporation, a subsidiary of The Boeing Company, Manassas, VA (US)

(72) Inventor: Robert William Parks, San Jose, CA (US)

(73) Assignee: Aurora Flight Sciences Corporation, a subsidiary of The Boeing Company, Manassas, VA (US)

( * ) Notice: Subject to any disclaimer, the term of this patent is extended or adjusted under 35 U.S.C. 154(b) by 143 days.

(21) Appl. No.: 16/878,529

(22) Filed: May 19, 2020

(65) Prior Publication Data

US 2021/0362836 A1    Nov. 25, 2021

(51) Int. Cl.
*B64C 11/00* (2006.01)
*B64C 29/00* (2006.01)

(52) U.S. Cl.
CPC ........ *B64C 11/001* (2013.01); *B64C 29/0025* (2013.01)

(58) Field of Classification Search
CPC ..... B64C 11/001; B64C 29/0025; E06B 7/08; E06B 7/084; E06B 7/086; E06B 7/092
See application file for complete search history.

(56) References Cited

U.S. PATENT DOCUMENTS

| | | | | |
|---|---|---|---|---|
| 2,736,514 A | * | 2/1956 | Ross | B64C 29/0025 244/15 |
| 3,116,898 A | * | 1/1964 | Clark | B64C 29/0016 244/23 B |
| 3,369,773 A | * | 2/1968 | Erwin | B64C 29/0016 244/12.3 |
| 3,638,884 A | | 2/1972 | Timperman | |
| 4,828,203 A | * | 5/1989 | Clifton | B64C 29/0033 244/12.3 |
| 6,561,456 B1 | * | 5/2003 | Devine | B64C 29/0025 244/12.3 |
| 2009/0084907 A1 | * | 4/2009 | Yoeli | B64C 27/20 415/149.1 |

(Continued)

FOREIGN PATENT DOCUMENTS

| | | | | |
|---|---|---|---|---|
| DE | 102008037696 A1 | * | 2/2010 | ............ E06B 7/086 |
| DE | 102019118023 B3 | | 7/2020 | |

(Continued)

OTHER PUBLICATIONS

European Patent Office, Extended European Search Report regarding European Patent Application No. 21215626.9, dated Apr. 25, 2022, 12 pages.

(Continued)

*Primary Examiner* — Nicholas McFall
*Assistant Examiner* — Terri L Filosi
(74) *Attorney, Agent, or Firm* — Kolisch Hartwell, P.C.

(57) ABSTRACT

A fan apparatus is disclosed, including a duct having an inlet opening, a fan mounted in the duct, and a plurality of louver devices positioned at the inlet opening. Each louver device has an open position and a closed position, and adjacent louver devices define a plurality of airflow channels. Each airflow channel has a curvature profile that changes as the louver devices move between open and closed positions.

19 Claims, 10 Drawing Sheets

(56) References Cited

U.S. PATENT DOCUMENTS

| | | |
|---|---|---|
| 2017/0321602 A1 | 11/2017 | Guijarro Valencia et al. |
| 2018/0186449 A1 | 7/2018 | Jiang |
| 2019/0338728 A1 | 11/2019 | Hussain |
| 2020/0009974 A1 | 1/2020 | Bender et al. |
| 2020/0009989 A1 | 1/2020 | Muller |
| 2020/0010185 A1 | 1/2020 | Bender |
| 2020/0010186 A1 | 1/2020 | Bender et al. |
| 2020/0010188 A1 | 1/2020 | Fauri |
| 2020/0010209 A1 | 1/2020 | Bender |
| 2020/0010210 A1 | 1/2020 | Warbeck |
| 2023/0174253 A1 | 6/2023 | Chew |

FOREIGN PATENT DOCUMENTS

| | | | |
|---|---|---|---|
| FR | 2061703 A1 | 6/1971 | |
| FR | 2986210 A1 | 8/2013 | |
| JP | H035818 Y2 * | 2/1991 | ............... F24H 3/02 |

OTHER PUBLICATIONS

U.S. Patent and Trademark Office, Non-Final Office Action regarding U.S. Appl. No. 17/555,299, dated Aug. 21, 2023, 30 pages.

* cited by examiner

UPPER SURFACE LOUVERS FOR LIFT FANS

BACKGROUND

Vertical Take-Off and Landing (VTOL) aircraft offer desirable operational versatility, but require efficient and reliable transition between two aerodynamic modes. A variety of designs have been used to achieve a changeover from vertical thrust to horizontal acceleration. One approach includes a lift fan mounted in a duct extending vertically through the aircraft wing. A cover of some type over the fan is actuated to introduce or exclude air.

However, during transition between forward flight and hovering the cover must turn the flow of air over the wing into the duct. This sharp turn may result in flow separation and turbulence, as well as significant loading on the system used to actuate movement of the cover. Thrust may be reduced, drag increased, and vibration transmitted to the aircraft wing. Therefore an aerodynamically and structurally efficient cover for a wing-embedded lift fan is desirable.

SUMMARY

The present disclosure provides systems, apparatus, and methods relating to louvered lift fan covers. In some examples, a fan apparatus may include a duct having an inlet opening, a fan mounted in the duct, and a plurality of louver devices positioned at the inlet opening. Each louver device may have an open position and a closed position, and adjacent louver devices may define a plurality of airflow channels. Each airflow channel may have a curvature profile that changes as the louver devices move between open and closed positions.

In some examples, an aircraft may include a lift fan and an airfoil structure containing the lift fan. The airfoil structure may have an airfoil surface including a lift fan cover configured to move between an open position and a closed position when the aircraft shifts from a hover mode to a horizontal flight mode. The lift fan cover may include a plurality of louver devices, and adjacent louver devices may define a plurality of airflow channels. Each airflow channel may have a curvature profile that changes as the lift fan cover moves between the open and closed positions.

In some examples, a method of controlling airflow into a lift fan on an aircraft during a transition phase between horizontal flight and hover modes may include using a plurality of louver devices extending over a lift fan of an airfoil surface. The method may further include changing curvature profiles of airflow channels between adjacent louver devices as the louver devices move between open and closed positions.

Features, functions, and advantages may be achieved independently in various examples of the present disclosure, or may be combined in yet other examples, further details of which can be seen with reference to the following description and drawings.

DETAILED DESCRIPTION

Figure 1:
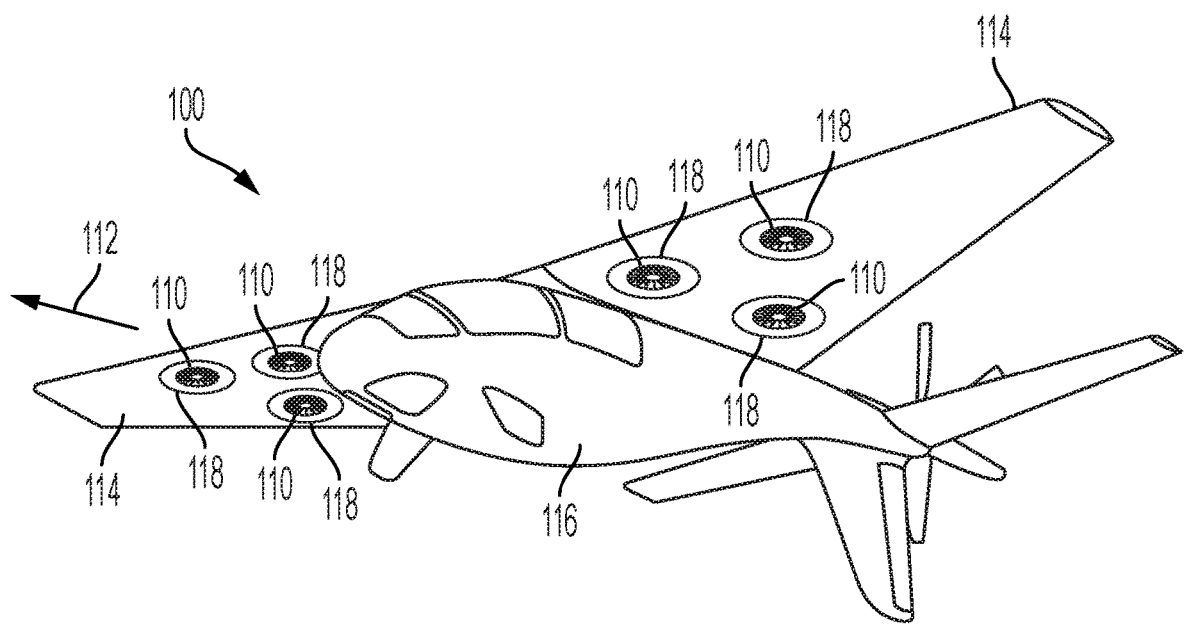
FIG. 1 is an isometric view of an illustrative Vertical Take-Off and Landing (VTOL) aircraft.

Various aspects and examples of a fan cover having louvers, as well as related methods, are described below and illustrated in the associated drawings. Unless otherwise specified, a louvered fan cover in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through C, each of which is labeled accordingly.

Overview

In general, a fan having a louvered cover in accordance with the present teachings may include a plurality of louver devices. Each louver device may be positioned at and span an inlet opening of a duct in which the fan is mounted, and may include a fixed portion and a movable portion. Each pair of adjacent louver devices may define an airflow channel. A forward-most and a rear-most louver device may also define air channels with the duct. In some examples the plurality of fixed portions may be rigidly connected to form a frame. Each movable portion may be rotatably connected, and/or hinged, to the corresponding fixed portion. The moveable portions may also be referred to as flaps, slats, fins, and/or vanes.

Each louver device may have an open position and a closed position, collectively forming an open position and a closed position of the louvered cover. In the open position, the movable portions may be positioned to allow air through the airflow channels into the fan duct. In the closed position the movable portions may be positioned to exclude air from the airflow channels and consequently from the fan duct. Each airflow channel may have a curvature profile that changes as the louver devices change position, increasing in average radius of curvature and decreasing in absolute angle as the louver devices open.

The fixed portions may accommodate a majority of loads associated with turning airflow into the fan duct, while the movable portions may each be positioned to optimize the curvature profile of the adjacent airflow channels, and to minimize actuator loads by maintaining a limited angle of attack. The movable portions and the fixed portions may be individually and/or cooperatively aerodynamically shaped to direct airflow. For example, together each movable portion and corresponding fixed portion may form a slotted airfoil shape.

The fixed portions may be fixed to the fan duct and/or integrated with the fan structure in any effective manner. The louvered fan cover may further include an actuator system, configured to actuate rotation of the movable portions. The actuator system may include any effective actuating mechanism, including but not limited to a translatable member and rotatably linked lever structures.

Examples, Components, and Alternatives

The following sections describe selected aspects of exemplary fan covers as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative VTOL Aircraft Thrust Fan

As shown in FIGS. 1-14, this section describes an illustrative aircraft 100 having lift fans 110. Lift fans 110 are examples of a fan with a louvered cover as described above. In FIG. 1, aircraft 100 is depicted in horizontal wing-supported flight, with a forward flight direction 112. The aircraft includes two fixed wings 114 extending from a fuselage 116. Each wing 114 includes three lift fans 110, with each fan mounted in a duct 118 extending through the wing. In general, aircraft 100 may include any effective number of lift fans, mounted in any effective position in wings 114, fuselage 116, and/or other flight surface(s) or airfoil structure(s) of the aircraft. One having ordinary skill in the art would appreciate that the number and positions of the fans may vary depending on aircraft configuration and phases of flights the aircraft is required to perform, for example take-off, climb, hover, outboard transition, cruise, forward-flight, descent, inboard transition and landing.

Figure 2:
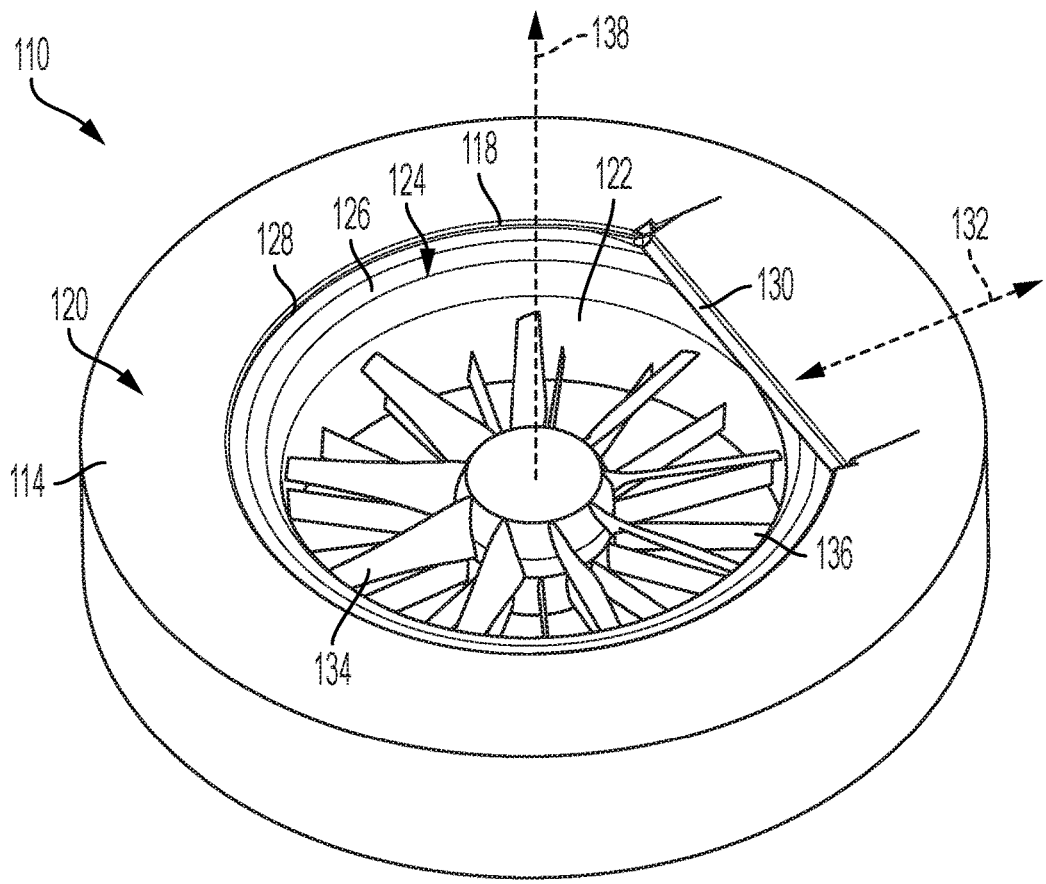
FIG. 2 is an isometric top view of a lift fan of the aircraft of FIG. 1.

FIG. 2 is a detail view of one of lift fans 110 in the respective duct 118, showing only a surrounding portion of wing 114. The wing has an upper surface 120, which may also be referred to as a flight surface, and a lower surface, not shown. In the present example, the surrounding portion of the wing is approximately flat, with upper surface 120 and the lower surface being generally planar. The present description may be understood to apply similarly to contoured wing shapes. Where structures in the present example are depicted as planar to conform to upper surface 120, in such examples the structures may be curved and/or contoured to conform to the upper surface.

Duct 118 is an approximately circular aperture through wing 114, defined by a duct wall 122. The duct has an inlet opening 124 at upper surface 120 of the wing. A boundary portion 126 of duct wall 122 is joined to the upper surface, and includes a recess 128 and an aft vane support 130 as described further with reference to FIG. 3, below. Duct 118 may be described as having a fore-to-aft direction or longitudinal axis 132 as defined by the position of the duct in aircraft 100. When the aircraft is in horizontal flight, the fore-to-aft or longitudinal direction may coincide with a relative wind direction, where relative wind is defined as the direction of movement of the surrounding atmosphere relative to the aircraft.

Lift fan 110 includes a fan blade assembly 134 and a stator 136. The stator is rigidly fixed to duct wall 122. The fan blade assembly is mounted above, and supported on stator 136. Fan blade assembly 134 has a rotational axis 138, which is aligned with a central axis of duct 118. The fan blade assembly is configured rotate about rotational axis 138, moving relative to stator 136 and duct 118. Lift fan 110 may be referred to as contained in wing 114.

Figure 5:
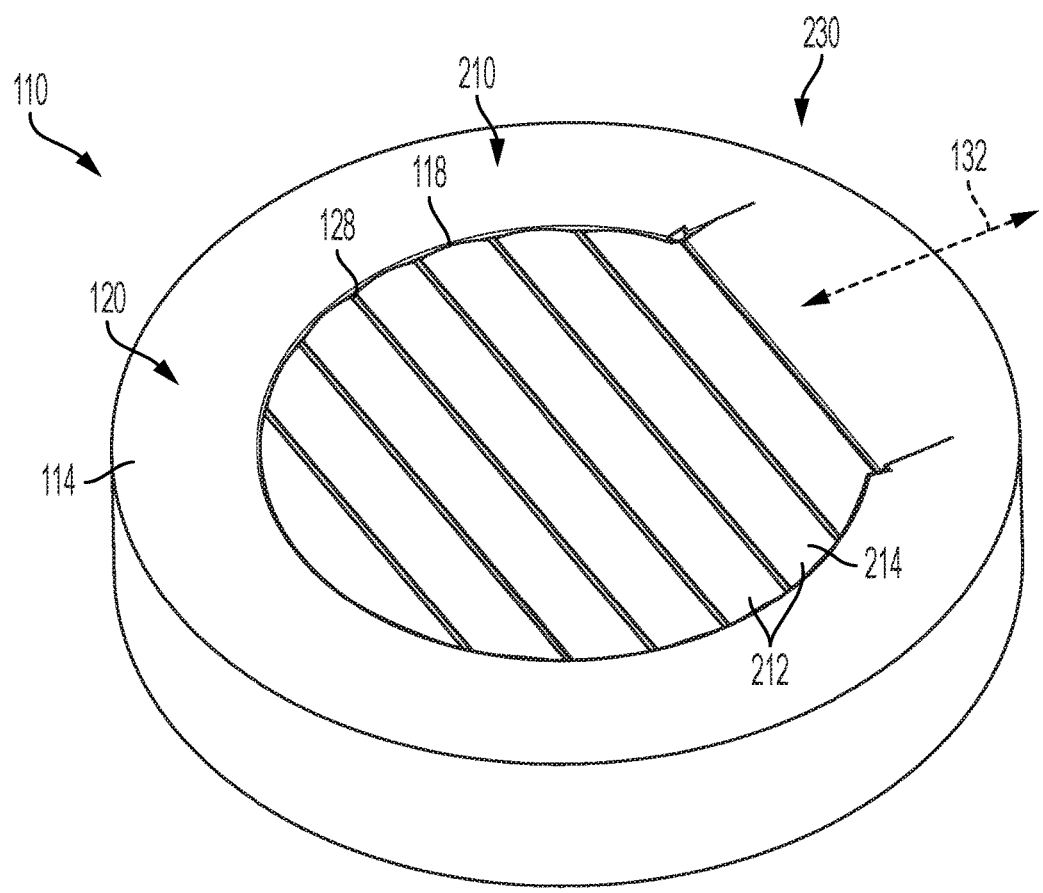
FIG. 5 is an isometric top view of the fan of FIG. 2, with vanes of the louver cover in a closed position.
Figure 7:
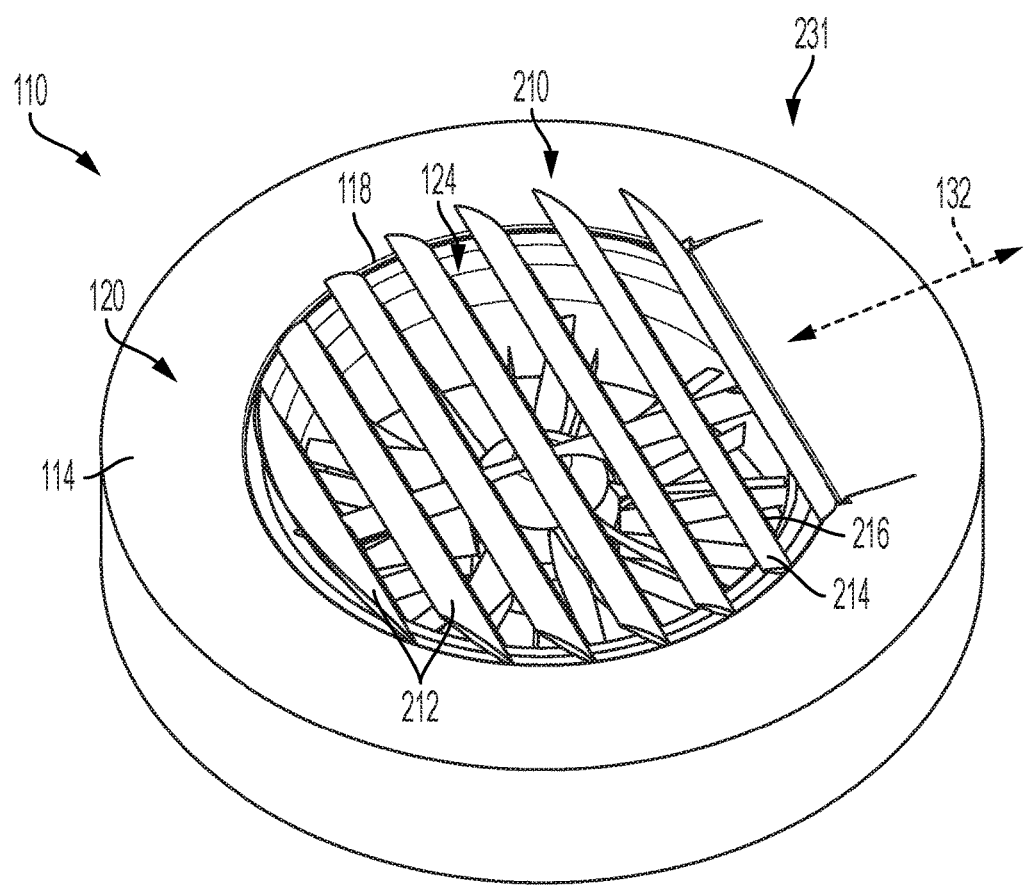
FIG. 7 is an isometric top view of the fan of FIG. 2, with the vanes of the louver cover in a transitional position.
Figure 9:
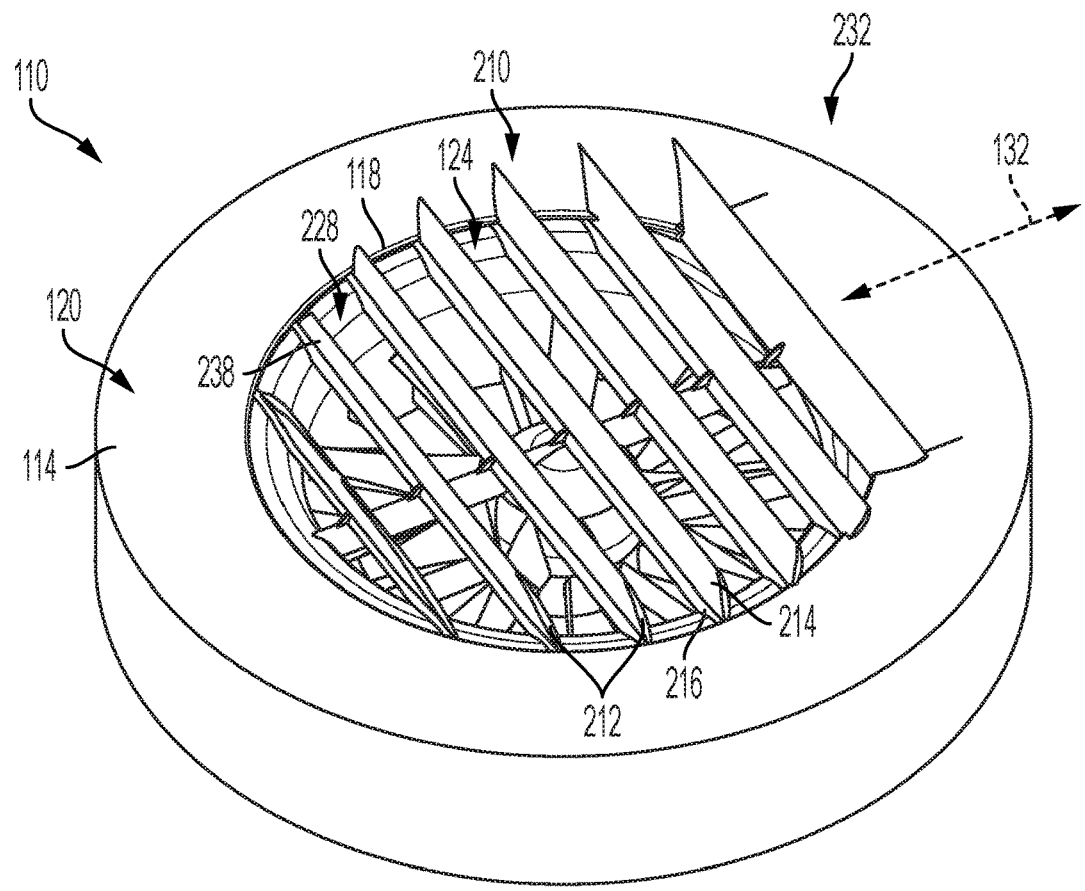
FIG. 9 is an isometric top view of the fan of FIG. 2, with the vanes of the louver cover in an open position.

FIGS. 5, 7, and 9 show a louvered cover 210 of lift fan 110 in three different positions, including a closed position, a transitional position, and an open position. The cover includes a set of louver devices 212, each device including a movable louver portion 214 and a fixed louver portion 216. The moveable louver portions may also be described as distal portions or vanes, and the fixed louver portions may also be described as proximal portions, air deflectors, or deflectors. Vanes 214 are rotatable relative to deflectors 216, to transition cover 210 between positions, while deflectors 216 stay in a fixed position relative to wing 114.

Louver devices 212 may be described as positioned at inlet opening 124, and/or as spanning the inlet opening. Each louver device has a lateral extent or span, from a first end to a second end, which is generally perpendicular to longitudinal axis 132. Each louver device is shaped to conform to the shape of duct 118, for example a circular shape, having differing spans and rounding at the first and second ends, and being configured for installation at a different longitudinal position. Each of vanes 214 and each of deflectors 216 may be described as having an airfoil shape, configured to direct airflow according to a position of cover 210.

Figure 3:
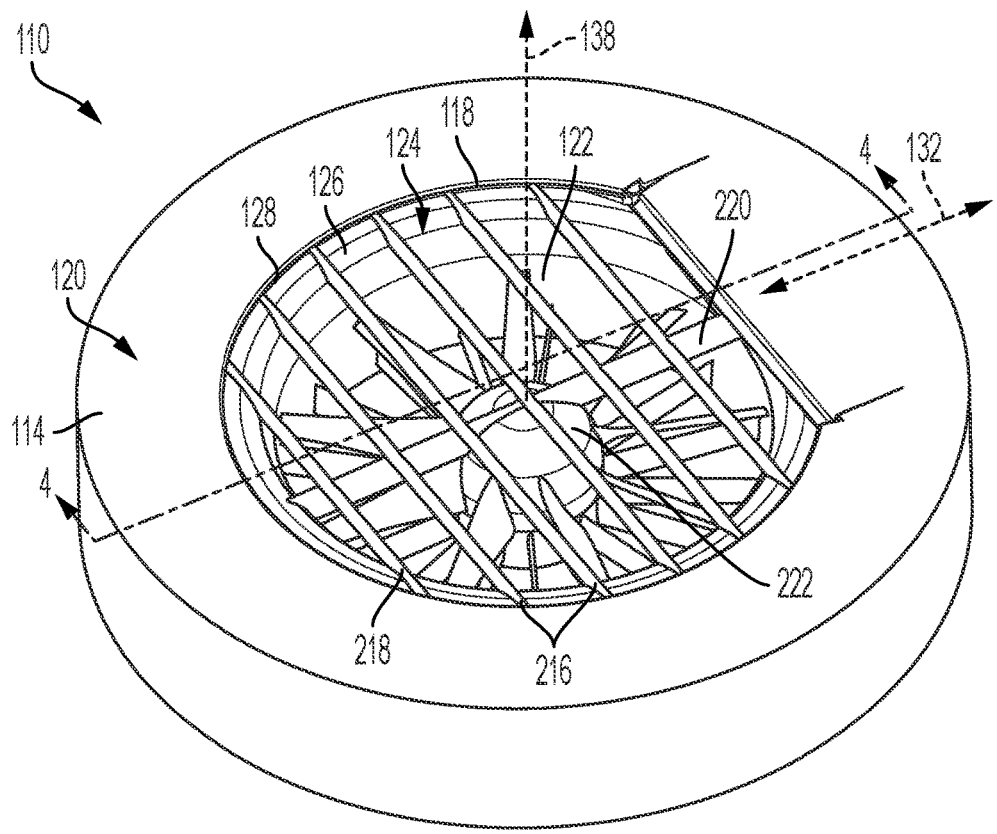
FIG. 3 is an isometric top view of the fan of FIG. 2, with a frame of a louver cover.

FIG. 3 shows a frame 218 of cover 210, which includes deflectors 216. The frame further includes a strut 220, extending generally parallel with longitudinal axis 132.

Deflectors 216 span duct 118 laterally, generally parallel to one another and generally perpendicular to the strut. The airfoil-shaped cross-sectional extent of each deflector is positioned at a fixed angle relative to rotational axis 138. In the present exemplary depiction, each deflector is positioned at the same angle. In some examples, the angle may vary between deflectors and may be selected according to longitudinal position. The angle may also be selected according to properties of the aircraft, wing design, and/or a selected control mechanism.

Strut 220 is connected to each of deflectors 216. In the present example, the strut is connected at a lateral center point of each deflector. In some examples, each deflector may be a single structural member, which extends through the strut. In some examples, each deflector may include a first portion extending perpendicularly from a first side of the strut and a second separate portion extending perpendicularly from a second, opposing side of the strut.

In the present example, frame 218 further includes a hub portion 222, supported by strut 220 and two of deflectors 216. The hub portion is centered in duct 118, and aligned with rotational axis 138 of lift fan 110. In some examples, the frame may include two or more struts parallel to longitudinal axis 132, one or more struts oblique to longitudinal axis 132, may include only deflectors 216, and/or may include any structurally appropriate features. A single strut may be preferable aerodynamically, but use of additional struts may offer better structural properties and allow a lighter frame.

Frame 218 is configured to act as a structural unit. In other words, the components of the frame support and reinforce one another. Such structural support may allow deflectors 216 to accommodate greater aerodynamic loads, and improve structural frequency modes. In the present example, deflectors 216, strut 220, and hub portion 222 are rigidly fixed together. In some examples, frame 218 may be machined or other otherwise manufactured as a single monolithic structure.

Frame 218 is rigidly fixed to duct wall 122. Strut 220 is fixed at a top end of the duct wall, and a first end and a second end of each deflector 216 is fixed to boundary portion 126 of the duct wall. The ends of the deflectors rest in recess 128 of the duct wall, and may be described as inset into upper surface 120 of the wing. Frame 218 may be flush with or below upper surface 120.

Figure 4:
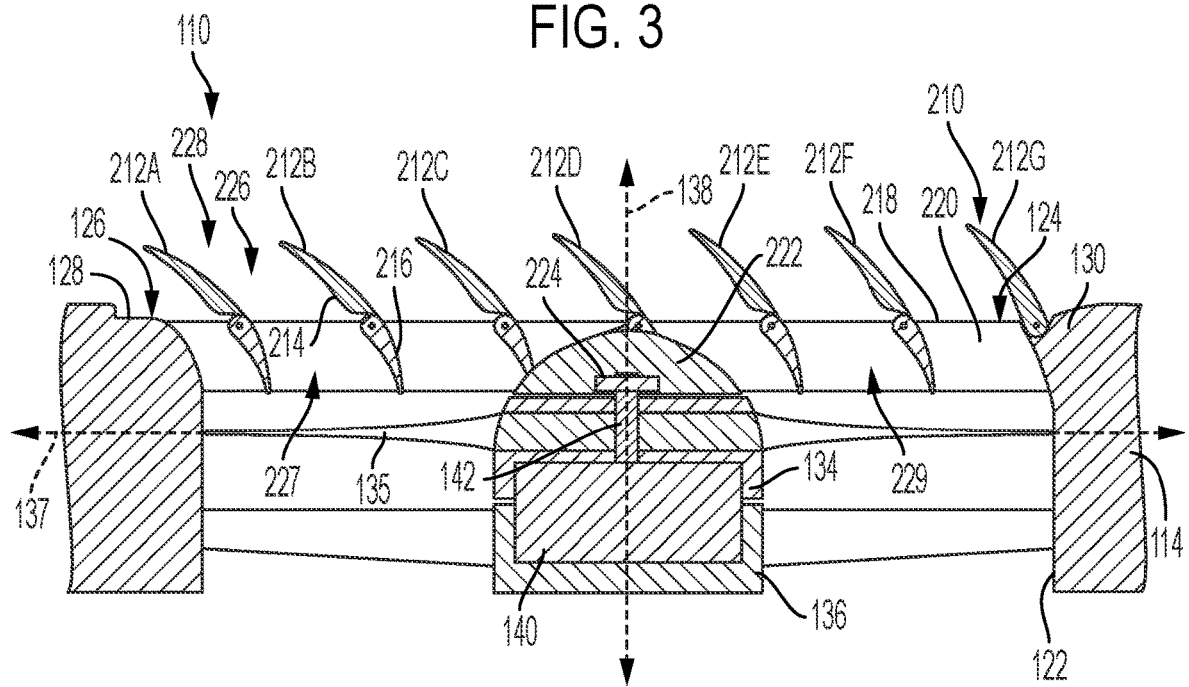
FIG. 4 is a cross-sectional view of the fan and the frame of the louver cover of FIG. 3, along lines 4-4, further including vanes of the louver cover.

FIG. 4 is a cross-sectional view of lift fan 110, including fan blade assembly 134, a motor 140, and a driveshaft 142. Together, central portions of stator 136, the fan blade assembly, and hub portion 222 of frame 218 form a fan housing or center body enclosing the motor and driveshaft. Motor 140 and fan blade assembly 134 are supported from below by stator 136, and in the present example are further supported from above by frame 218. Hub portion 222 includes a bearing 224 configured to engage and support driveshaft 142. Such dual support may allow use of a lighter stator and take advantage of the structural strength of frame 218.

Fan motor 140 turns driveshaft 142, which in turn rotates blades 135 of fan blade assembly 134. The fan blades may be described as defining a plane 137, perpendicular to rotational axis 138. Louver devices 212 define a plurality of airflow channels 226, configured to direct air to the fan blades. Each airflow channel 226 is an open passage defined between a pair of adjacent louver devices 212, or between a louver device and duct wall 122, and extend from about duct 118 through inlet opening 124 into the duct.

Each airflow channel 226 may be described as having a first or lower portion 227 proximal the fan blades and a second or upper portion 228 distal the fan blades. The lower portion may be defined between adjacent deflectors 216, and the upper portion may be defined between adjacent vanes 214. Upper portion 228 may be configured to align with an incoming flow of air from above and/or over the wing. Lower portion 227 may be configured to turn the incoming flow of air, and to direct the air in a direction substantially perpendicular to plane 137.

Duct 118 is also shaped to direct airflow into lift fan 110. In the present example, boundary portion 126 is curved from duct wall 122 through recess 128, around a majority of the circumference of the duct. At aft vane support 130, boundary portion 126 is curved to match or simulate a deflector. In general, duct 118 may be shaped according to lift fan duct design principles and/or to cooperatively define a desired shape of adjacent airflow channels 226.

Figure 6:
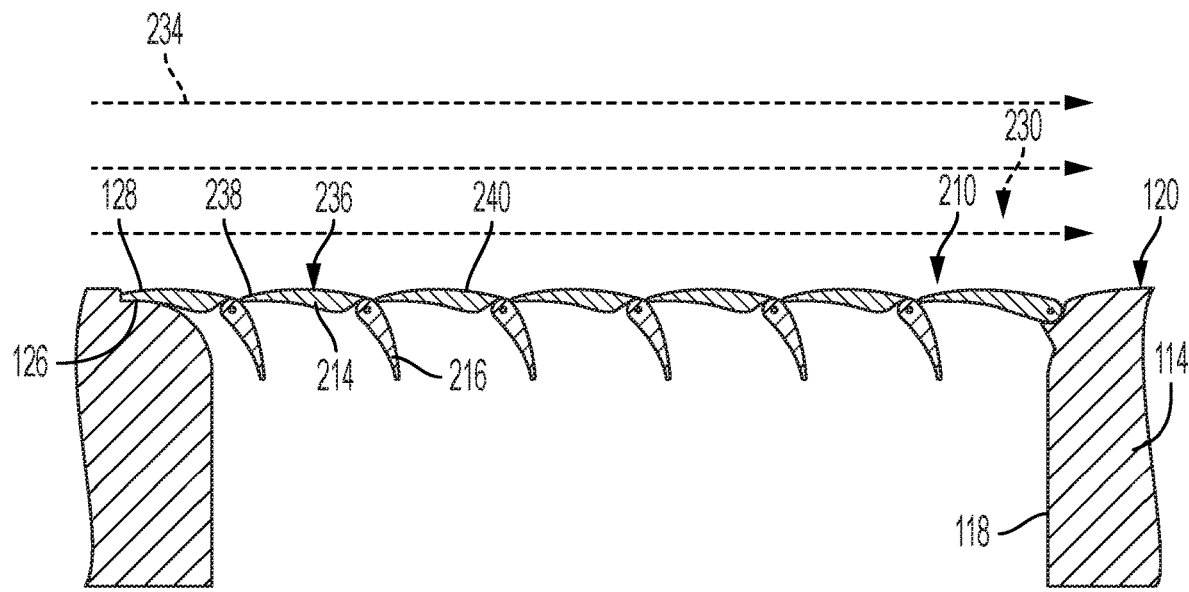
FIG. 6 is a schematic diagram of airflow over the louver cover of FIG. 5.
Figure 8:
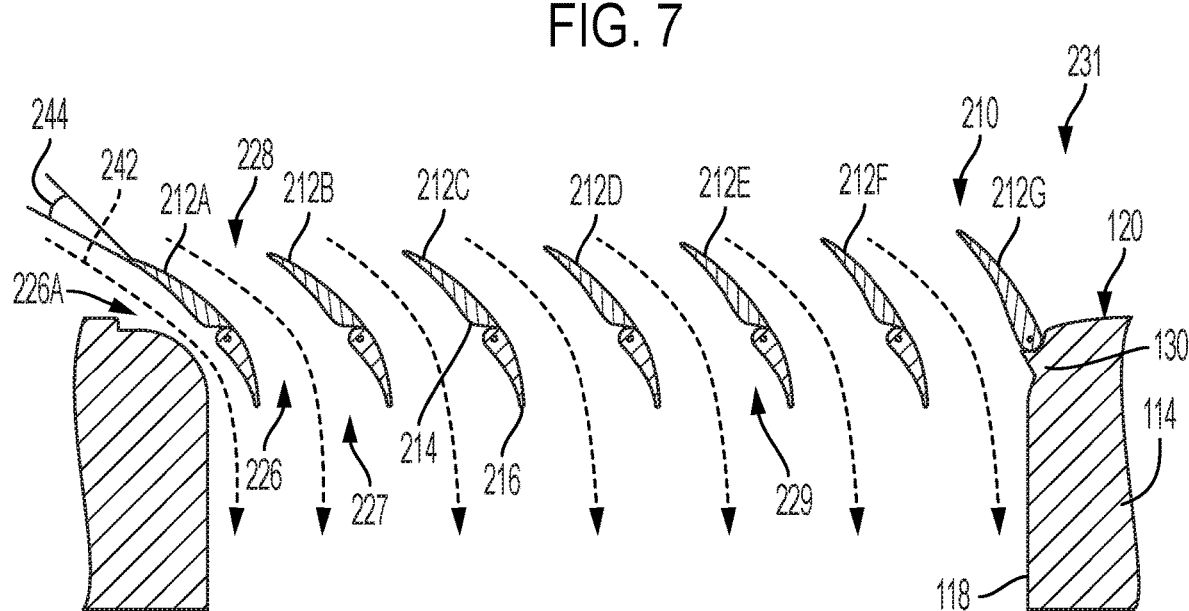
FIG. 8 is a schematic diagram of airflow over the louver cover of FIG. 7.
Figure 10:
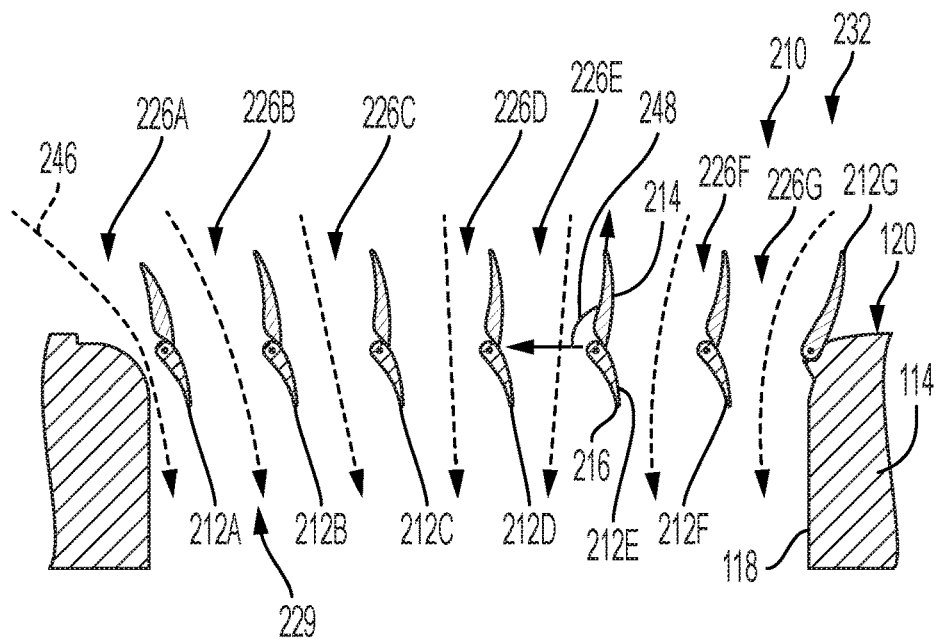
FIG. 10 is a schematic diagram of airflow over the louver cover of FIG. 9.

Airflow channels 226 may change as cover 210 is opened and closed. Each channel may be described as having a curvature profile 229 that alters as vanes 214 are rotated relative to deflectors 216. The curvature profile of each airflow channel may differ, and may change differently from the other airflow channels as the cover is opened or closed. As shown in FIGS. 6, 8, and 10, air may flow differently through the channels depending on the position of the cover.

Cover 210 has a closed position 230, shown in FIG. 5, and an open position 232, shown in FIG. 9. A transitional position 231 between open and closed, is shown in FIG. 7. Cover 210 may transition between the three positions by rotation of vanes 214. Depicted transitional position 231 may be one of many transitional positions assumed by cover 210 during a transition between open position 232 and closed position 230. A specific transitional position may be maintained according to an appropriate angle of vanes 214, as described further below. Closed position 230 may be used for wing-borne flight of the aircraft, and open position 232 may be used when the aircraft hovers.

Cover 210 may be maintain transitional position 231 and/or transition through one or more transitional positions when the aircraft is in transition between hovering and wing-borne flight. Such transition operation may place the greatest demand on power systems of the aircraft, as full forward acceleration and full vertical thrust are required simultaneously. Accordingly, cover 210 may be optimized to provide best airflow and performance in transitional position 231.

As shown in FIG. 5, vanes 214 lie approximately flush with upper surface 120 of wing 114 in closed position 230. Each vane spans the opening of the duct, with a first end and a second end each received in recess 128 of the duct. The first and second ends of the vanes are rounded to match the circular shape of the recess and duct opening.

The airflow channels may be closed off by the vanes 214, and gaps between adjacent vanes minimized to prevent passage of air between the vanes and into the fan duct. In other words, vanes 214 may be configured to exclude air from the inlet opening of the fan in the closed position. Cover 210 may be configured to act as part of upper surface 120 of the wing, and vanes 214 may be shaped such that an upper surface of the closed cover approximately conforms to a contour of the wing.

FIG. 6 schematically depicts airflow 234 when the aircraft is primarily in wing-borne flight. Airflow 234 results from the forward speed of the aircraft and may approximately follow the contour of wing 114. The airflow may also be described as an airstream or relative wind, as defined above.

In closed position 230, cover 210 is configured to limit any disturbance of or effect on airflow 234 by the cover. An upper surface of the cover may be designed to avoid separation of airflow 234 from the cover and/or the wing downstream of the cover.

Vanes 214 are approximately parallel to airflow 234, and the air flows over an upper surface 236 of the vanes. Each vane 214 may be described as having a distal edge portion or leading edge 238, and a proximal connecting portion or hinge end 240. In the closed position, leading edge 238 of each vane may be proximate to and/or contact hinge end 240 of the upstream-adjacent vane. Leading edge 238 of the forward-most vane is received into recess 128 of duct 118.

Cover 210 may be configured to cleanly close and/or effectively seal. In some examples, vanes 214 may overlap in the closed position. In some examples, leading edge 238 of some or all of the vanes may include a flexible material such as a rubber or elastomer. Such a material may allow the leading edge to conform minimally to the adjacent vane and create a seal between vanes. In some examples, recess 128 and/or boundary portion 126 may similarly include a material appropriate to forming a seal with vanes 214.

Vanes 214 may be rotated relative to deflectors 216, as discussed further below with respect to FIGS. 11-13, to transition cover 210 from closed position 230 to transitional position 231 as shown in FIG. 7. In the transitional position, vanes 214 are positioned to minimize aerodynamic loads on the vanes and maximize airflow into lift fan 110 while the aircraft is utilizing both vertical thrust from lift fan 110 and forward acceleration (i.e. during a transition phase of flight from hover to forward flights).

FIG. 8 schematically depicts airflow 242 when the aircraft is in a transition phase of flight. Airflow 242 results from a combination of the forward speed of the aircraft and suction from operation of the fan. The airflow may be at an angle relative to upper surface 120 of wing 114, which depends on factors such as air speed, fan throttle setting, and the position of duct 118 in the wing. The airflow angle may vary over duct 118 along longitudinal axis 132.

Cover 210 is configured to turn airflow 242 down into duct 118, perpendicular to the fan blade plane, as discussed above. Turning airflow 242 may exert aerodynamic loads on louver devices 212. For a typical louver, aerodynamic loads may be concentrated at the leading edge of the louver while rotation is actuated at a hinge or pivot point at an opposite edge, resulting in a large structural load and requiring increased structural strength in the louver, pivot, and actuator.

In cover 210, because only vanes 214 rotate, the distance between the leading edge and pivot point is decreased, thereby decreasing structural loads. Further, vanes 214 are positioned to avoid or limit aerodynamic loads, while deflectors 216 primarily carry the loading associated with turning the airflow. That is, vanes 214 are positioned to point leading edges 238 directly into airflow 242 and therefore avoid or reduce loading. Fixed deflectors 216 have the structural strength to accommodate all or a majority of the loads.

Vanes 214 may be described as having an airstream incidence angle or angle of attack 244 relative to airflow 242. The angle of attack may be zero when the vanes are ideally aligned with the airflow. However, ideal alignment may be an unstable equilibrium and difficult to maintain. Therefore, a minimal angle of attack may be maintained instead. For example, angle of attack 244 may be kept between positive and negative ten degrees. Alignment of vanes 214 may be maintained in such a manner in transitional positon 231 and all transitional positions, but may differ in open position 232 and closed position 230. That is, vanes 214 may be aligned with the airflow during transition flight, but not during horizontal flight or hover, as described with reference to FIGS. 6 and 10.

Louver device 212 may be shaped to facilitate redirection of airflow 242, and desired distribution of loading as discussed further below. In the depicted example, much of the overall camber of each louver device 212 is in deflector 216, so that the deflector carries more of the aerodynamic load. In other words, the airfoil shape of the louver device is most asymmetric in deflector 216. Deflector 216 is also configured to act as a slotted flap. More specifically, a small gap is left between vane 214 and deflector 216. This configuration may allow the deflector to sharply turn airflow 242 without stalling.

As characteristics of airflow 242 vary over duct 118 in the longitudinal direction, louver devices 212 may also vary in shape over the duct. In other words, each louver device may have a different airfoil shape. Vanes 214 may also rotate differently from one another and/or rotate at different rates to best match varying angles of attack 244 to the angle of airflow 242 entering each of the plurality of airflow channels. Control of each of the plurality of vanes 214 may be optimized to devise a profile of the plurality of vanes 214 relative to the direction of airflow, such that the profile complements the boundary layer formed over the duct or minimizes flow separation caused by the louver device 212. The profile may be controlled and vary depending on the present flow condition which changes during the transition phase of the flight.

In the present example, the set of louver devices 212 includes seven louver devices 212A-G, where louver device 212A is forward-most and louver device 212G is aft-most. Aft-most louver device 212G may be described as including only vane 214, or as including the vane and aft vane support 130. As shown in FIG. 4, deflectors 216 of central louver devices 212C and 212D are joined to hub portion 222.

As noted above, duct wall 122 may also be shaped to facilitate airflow into duct 118. More specifically, a forward-most section of the duct wall may be shaped to cooperate with forward-most louver device 212A to direct airflow 242. A first airflow channel 226A of the plurality of airflow channels, defined between the duct wall and louver device may be a critical area for possible flow separation during transition between hovering and wing-borne flight.

Curvature profile 229 of airflow channels 226 may be determined by the shapes of louver devices 212A-G and positions of vanes 214. Each airflow channel may have a different curvature profile 229, and each curvature profile may change as vanes 214 rotate to transition cover 210 between closed and open positions. More specifically, each airflow channel 226 may be described as having an average radius of curvature, and the average radius of curvature may increase from a minimum value in closed position 230 (See FIGS. 5-6) through transitional positions such as transitional position 231 (See FIGS. 7-8) to a maximum value in open position 232 (See FIGS. 9-10). Alternatively each airflow channel 226 may be described as having a relative angle between upper portion 228 and lower portion 227, the angle between the upper and lower portion decreasing as the cover transitions from the closed position to the open position.

FIG. 9 shows cover 210 in open position 232, with louver devices 212 positioned to maximize airflow into duct 118. Vanes 214 are rotated to full extent, widening upper portion 228 of airflow channels 226 and pointing leading edges 238 upward. Open position 232 may be appropriate during take-off, landing, and/or hovering when the aircraft substantially generates vertical thrust and not forward thrust.

FIG. 10 schematically depicts airflow 246, when the aircraft is in hover flight. Airflow 246 results from downward suction generated by the fan. Louver devices 212 are positioned to entrain air from a wide range of angles. More specifically, vane 214 of each of louver devices 212A-G is positioned at a different angle. Each vane has a different operating angular range of rotation 248. The angular range may be described as an angle between a closed position of the vane when cover 210 is in closed position 230 (See FIG. 6) and an open position of the vane when cover 210 is in open position 232. The angular range may also be described as a maximum range of rotation of vane 214 achievable in normal operation of cover 210.

Vane 214 of forward-most louver device 212A has a smallest angular range of rotation 248 and vane 214 of aft-most louver device 212G has a largest angular range of rotation 248. In the present example, angular range of rotation 248 of louver device 212A is approximately 70 degrees and the angular range of louver device 212G is approximately 100 degrees, with the angular ranges of louver devices 212B-212F increasing by approximately 5 degrees, fore-to-aft. In some examples, each angular range of rotation 248 may be between approximately 80 and 110 degrees. In general, the angular ranges of the louver devices, the difference in angular range between the forward-most and aft-most louvers, and pattern of angular range increase across the set of louver devices may be determined by the design of wing 114, duct 118, lift fan 110, and/or any factors related to airflow during hover flight.

In the present example, the gap formed between vanes 214 and deflectors 216 of louver devices 212 in transitional position 231 (See FIG. 8) is closed in open position 232. More specifically, with vanes 214 rotated to full extent, hinge end 240 of vanes 214 contacts deflectors 216. This contact may result from shaping of louver devices 212 to optimize curvature profile 229 of airflow channels 226 in transitional position 231. The gap may be unneeded in open position 232, as cover 210 performs only minimal turning of airflow 246, and stalling is unlikely.

Cover 210 may include any material and/or materials of appropriate structural strength. Preferably, the cover may comprise a strong and light material such as aircraft grade aluminum alloy and/or a carbon fiber composite. Design of cover 210, and in some examples of duct 118, may be tailored to the aircraft, position, and/or a selected control mechanism. In particular, the shapes and positioning of the elements of cover 210 may be refined according to computational fluid dynamics simulations.

Cover 210 may also be configured to optimize desired metrics and/or prioritize one or more aspects of performance. For example, upper surface 236 of vanes 214 (see FIG. 6) may be tuned for better performance in the closed position or the open position. A flatter shape of upper surface 236 may allow the cover to more closely approximate the contour or airfoil shape of the wing in the closed position, and minimize rippling of the cover surface, therefore improving horizontal flight performance. A more curved shape of upper surface 236, in particular a larger radius leading edge, may improve performance in the open and transitional positions.

As noted above, transitional flight may place the greatest demand on aircraft systems. Accordingly, cover 210 may preferably be configured to prioritize performance in transitional position 231 (See FIGS. 7-8) over performance in the open or closed positions.

Figure 11:
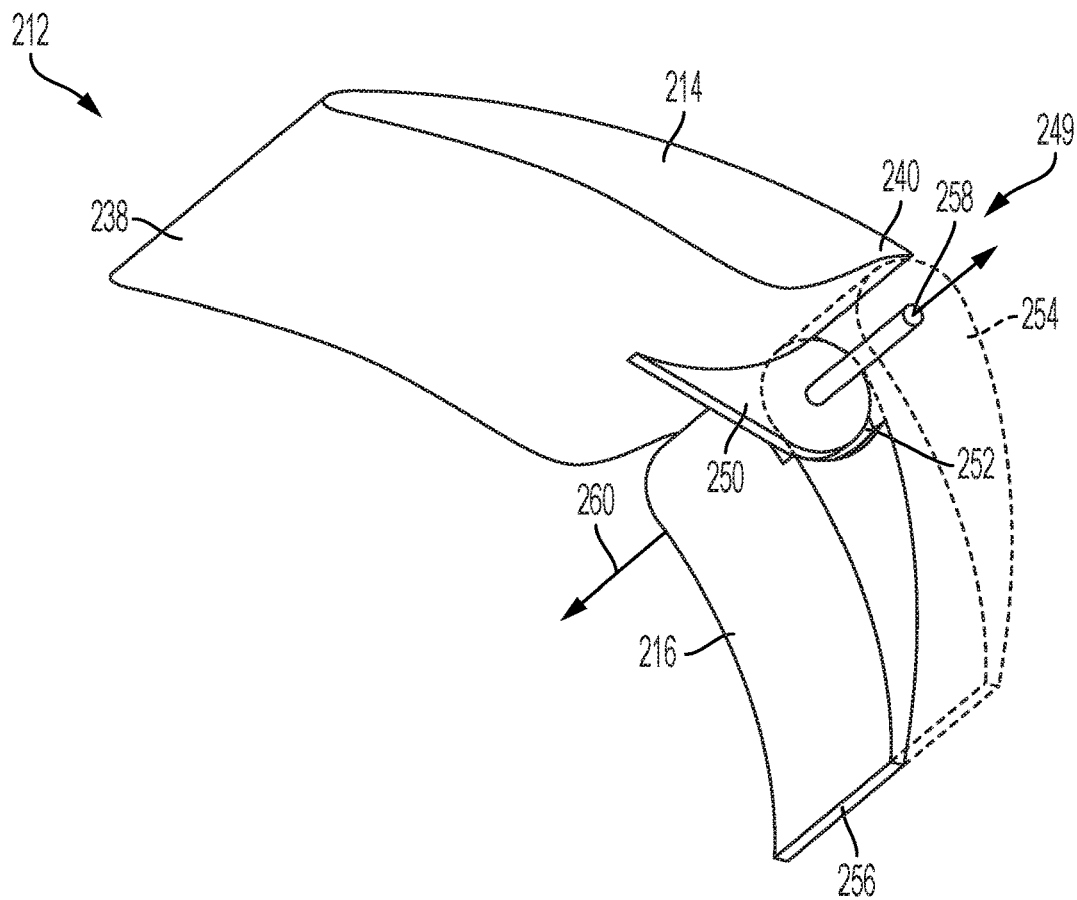
FIG. 11 is a partially transparent isometric detail view of a section of the frame and one of the vanes of the louver cover of FIGS. 4-10.

FIG. 11 is a partially transparent view of a portion of an illustrative one of louver devices 212, including vane 214 and deflector 216. As noted above, the vane and deflector are connected by a hinge 249. More specifically, vane 214 includes a tab 250 at hinge end 240. Deflector 216 includes a slot 252 at a head end 254, opposite a trailing edge 256. The slot is configured to receive tab 250 such that corresponding apertures in the tab and head end of deflector 216 are aligned. A hinge rod 258 extends through the aligned apertures, defining an axis of rotation 260. Louver device 212 may be described as having a tab-style or strap-style hinge.

Tab 250 and slot 252 are shaped to allow vane 214 to rotate about axis of rotation 260, relative to deflector 216. The vane may be rotatable at least through the limited angular range of rotation of the vane, as discussed above. In the present example, hinge 249 does not limit the rotational range of vane 214 and the limited angular range of rotation is instead determined by the actuation system and louver device shapes as discussed below. In some examples, tab 250, slot 252, and/or another element of the hinge mechanism may include a rotational stop structure or other feature to enforce the limited range.

Vane 214 and deflector 216 are also shaped to allow vane 214 to rotate about axis of rotation 260. Hinge end 240 of the vane may be described as having a socket shape, while head end 254 of deflector 216 may be described as radiused. This shape may allow hinge end 240 to remain spaced from head end 254 through closed and transitional positions of the cover, and only contact the head end at the outer limit of the angular range of rotation of the louver device, in the open position of the cover. In some examples, vane 214 may have a radiused hinge end while deflector 216 has a socket shaped head end. However, the depicted shapes may be preferable, as fitting and fairing in better as well as facilitating the slotted airfoil shape of louver device 212.

Axis of rotation 260 may be parallel to the span of louver devices 212 over the duct, generally perpendicular to forward flight direction 112 of aircraft 100 (See FIG. 1), and generally perpendicular to rotational axis 138 of lift fan 110 (See FIG. 2). Such orientation of the axis of rotation may facilitate direction of leading edge 238 of vane 214 into airflow over the wing resulting from forward acceleration of the aircraft.

In the present example, each louver device 212 includes multiple hinges 249. That is, each vane 214 includes multiple tabs 250 received in corresponding slots 252 of the deflector. More specifically, each louver device 212 includes five hinges 249. A single hinge rod 258 extends the full span of the louver device, through each of the hinges. Hinges 249 may be distributed in any structurally appropriate position along the span of the louver device. For example, the hinges may be equally spaced along the length of the device or a hinge may be positioned proximate each of the first and second ends of the louver device and proximate either side of the strut of the cover frame.

In some examples, louver device 212 may include other styles and/or numbers of hinges, and/or vane 214 may be otherwise rotatably connected to deflector 216. In some examples, each hinge 249 may include a separate hinge pin. In some examples, each louver device of the plurality of louver devices of the cover may include a different number of hinges and/or the hinges may be differently positioned along the span of the louver devices. In some examples, hinges 249 may be a 4 bar type linkage, which may allow more flexible tailoring of the gap between each vane 214 and corresponding deflector 216 as the angle of the vane 214 changes. Such examples may improve performance at the expense of additional linkage complexity.

Figure 12:
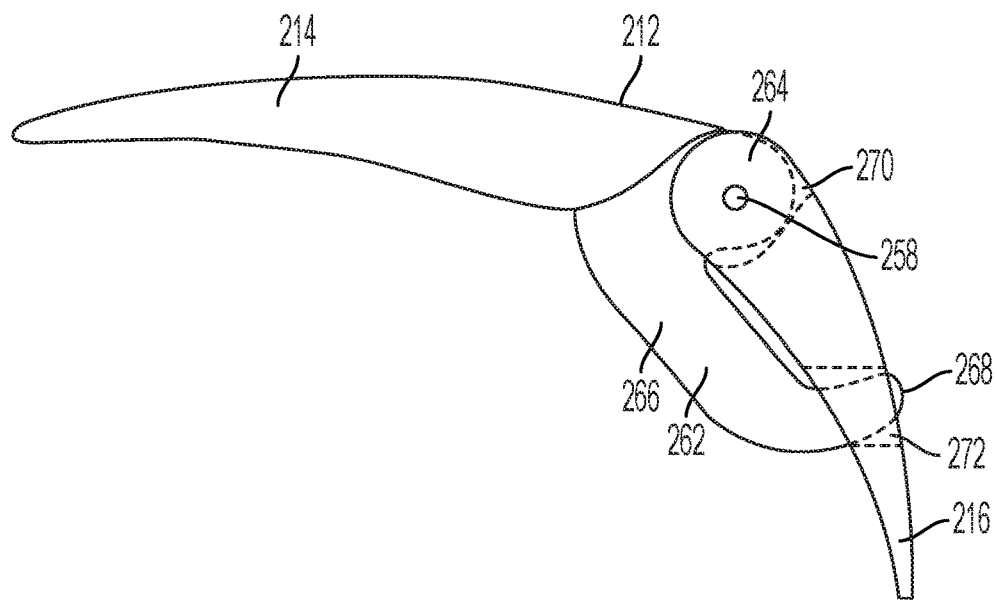
FIG. 12 is a cross-sectional detail view of the louver cover section of FIG. 11, and a control horn.
Figure 13:
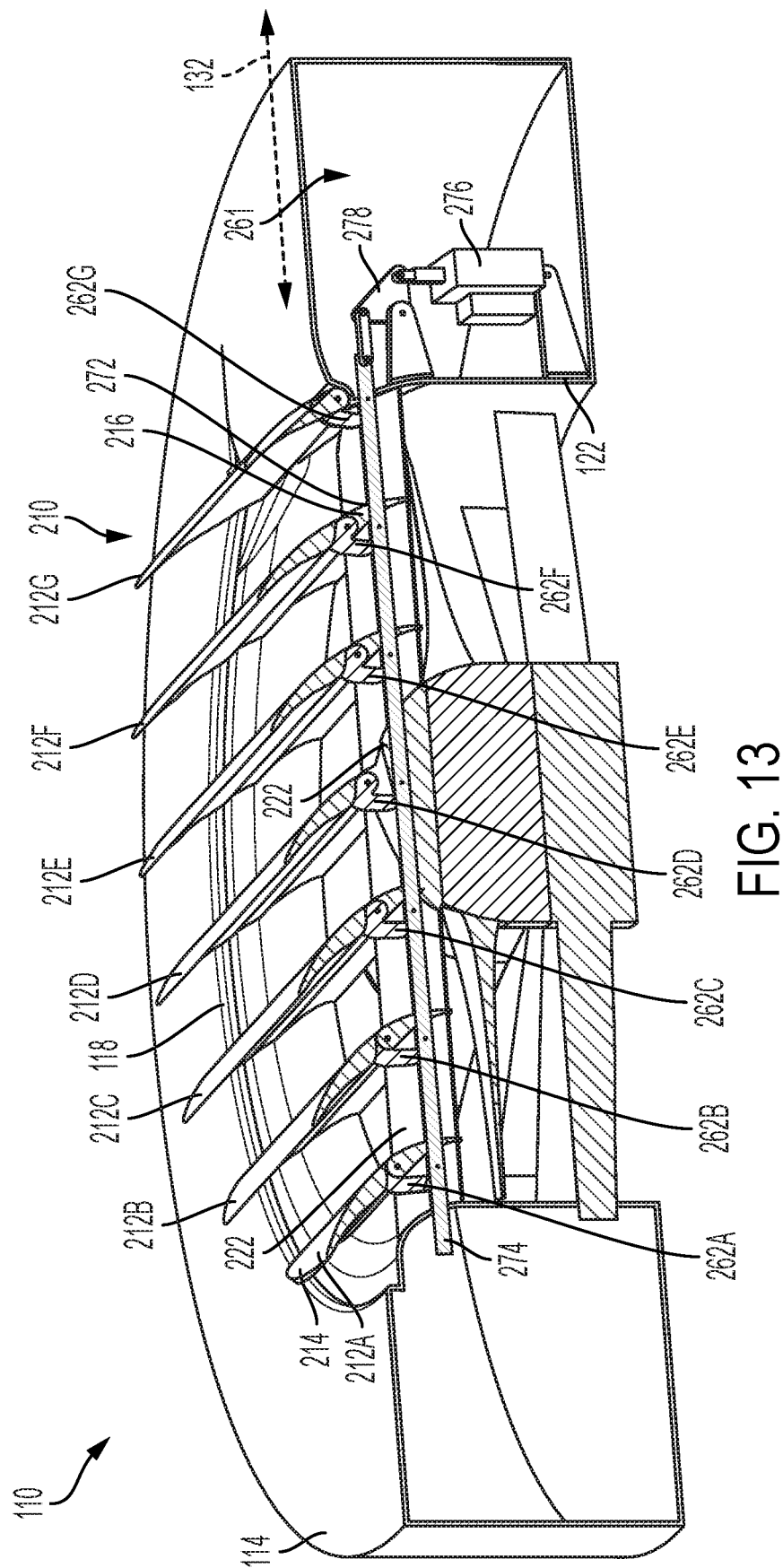
FIG. 13 is an isometric cross-sectional view of the fan and louver cover of FIGS. 4-10, showing an actuator mechanism of the louver cover.

Cover 210 further includes an actuation system 261, an illustrative example of which is shown in FIGS. 12-14. In general, any effective actuation system may be used with the louver devices of the cover. In the present example, actuation system 261 includes a plurality of control horns 262, each control horn actuating a corresponding one of louver devices 212. Control horns 262 may also be described as cams, levers, and/or linkages. Each control horn may have a different shape, to facilitate the desired rotation range and rate of each louver device.

FIG. 12 is a detail view of an illustrative control horn 262 and louver device 212, shown in the closed position. Control horn 262 has a generally curved shape, including a head portion 264, an arm portion 266, and a tail portion 268. Head portion 264 is fixed to vane 214, and received in a head slot 270 of deflector 216. Hinge rod 258 extends through an aperture in the head portion. Deflector 216 further includes an actuator slot 272.

In the closed position, as shown, tail portion 268 of control horn 262 extends through the actuator slot. Head portion 264 of control horn 262 may move similarly to the hinge tabs of vane 214, as described above, rotating with the vane relative to deflector 216 about the rotational axis defined by hinge rod 258. As the control horn rotates with vane 214 into the open position, the tail portion may extend from the actuator slot. When the control horn rotates with vane 214 back to the closed position, the tail portion may retract into the actuator slot FIG. 13 is a cross-sectional view of lift fan 110, including actuator system 261. In addition to control horns 262, the system further includes an actuator member which may be referred to as a linkage bar 274. The set of control horns 262 includes seven control horns 262A-G, corresponding to louver devices 212A-G, respectively. Each control horn 262 is rotatably connected to linkage bar 274 by a clevis pin or shoulder bolt.

In the present example, strut 220 is hollow, and the linkage bar and control horns are housed inside the strut. Linkage bar 274 extends through actuator slots 272 of deflectors 216, and a corresponding slot through hub portion 222. Slots in a top surface of the strut accommodate motion of head portion 264 of control horns 262 above the top of the strut in open position 232, as shown in FIG. 9. In examples where cover 210 includes multiple struts, a linkage bar and control horns may be housed in each strut, to drive each louver device 212 at multiple points along the span of the louver device. The greater stiffness of the linkage bars under tension and compression than vanes 214 under torsion may allow such a system. However, a single linkage system may be preferable as simpler and more robust.

Referring again to FIG. 13, linkage bar 274 is translated along longitudinal axis 132 by a linear actuator 276. The actuator type may be selected according to expected actuator loads and desired transition speed of cover 210. For example, for a plane having a flight mode transition time of approximately 20 seconds, a linear actuator having an end to end slew time of approximately 10 seconds may be sufficient. A small servo may be appropriate, but some stiffness may be needed to avoid divergence. In the present example, linear actuator 276 is an irreversible screw jack actuator. In some examples, a lball screw type actuator may be used, but the irreversibility of a low pitch non-ball screw drive may be an advantage in the case of an actuator failure.

Linear actuator 276 is operatively connected to linkage bar 274 by a bell crank 278. A shaft of the linear actuator is linked to one arm of the bell crank, and a short link connects the linkage bar to the other arm of the bell crank. Connection via bell crank 278 may allow the linear actuator 276 to be mounted against duct wall 122, interior to wing 114, with the shaft in a vertical orientation. Such a mounting position may minimize space needed in the wing for actuator system 261, but an appropriate system design and mounting location may depend on constraints such as other systems disposed in the wing. The short link may accommodate the different swing arms of bell crank 278 and control horns 262.

Linear motion of linkage bar 274 is translated to rotational motion of vanes 214 of louver devices 212 by control horns 262. That is, as linkage bar 274 is pulled or pushed along longitudinal axis 132, control horns 262 are constrained to rotate as tail portion 268 is moved linearly by the bolted connection to the linkage bar and head portion 264 remains restrained from linear motion by the hinge rod. Since vanes 214 are each fixed to a corresponding control horn 262, the vanes also rotate in response to the motion of the linkage bar. The angular range and rate of rotation of each vane 214 depends on the shape of the corresponding control horn 262, as shown in FIGS. 14A-C.

Figure 14A:
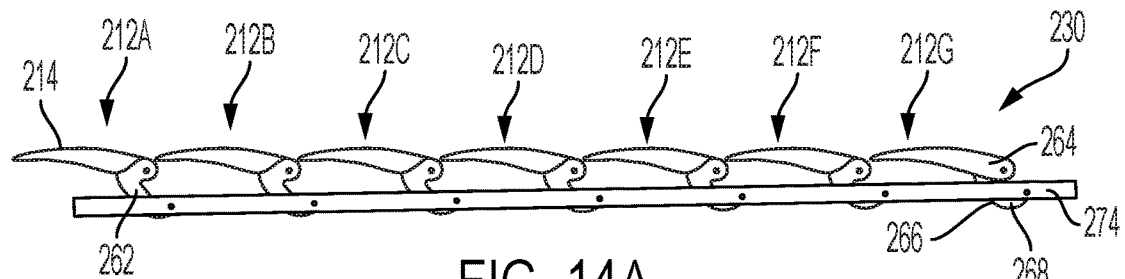
FIG. 14A is a schematic diagram of the vanes, control horns, and linkage bar of the louver cover of FIG. 13, in a closed position.
Figure 14B:
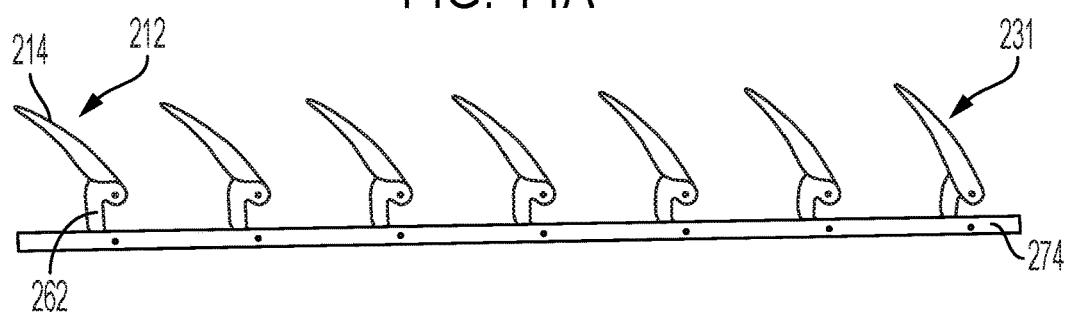
FIG. 14B is a schematic diagram of the vanes, control horns, and linkage bar of the louver cover of FIG. 13, in a transitional position.
Figure 14C:
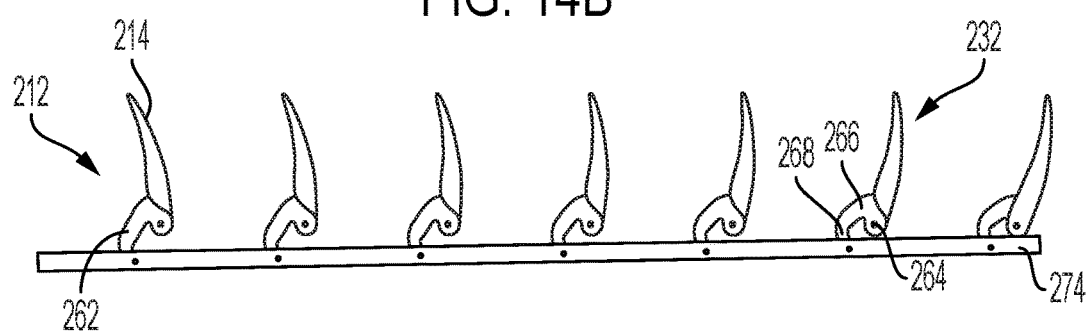
FIG. 14C is a schematic diagram of the vanes, control horns, and linkage bar of the louver cover of FIG. 13, in an open position.

FIG. 14A shows vanes 214 of louver devices 212A-G, control horns 262, and linkage bar 274 in closed position 230. FIG. 14B shows the vanes, control horns, and linkage bar in transitional position 231, and FIG. 14C shows the vanes, control horns, and linkage bar in open position 232. Each control horn 262 has a similarly shaped head portion 264 and tail portion 268, with a different length arm portion 266 and resulting overall curvature.

Forward-most control horn 262A has a longest arm portion 266, producing a smallest angular range of rotation in vane 214 of louver device 212A. Aft-most control horn 262G has a shortest arm portion, producing a greatest angular range of rotation in vane 214 of louver device 212G. In the present example, the length of arm portion 266 decreases linearly from control horn 262A to control horn 262G.

Effectively, length of arm portion 266 of the control horn determines the distance between the bolted connection to linkage bar 274 and the hinge rod. For a given throw distance of the linkage bar, a greater angular range is traversed when the distance between pivot points is smaller. The rotation occurs in the same time, whatever the angular range traversed, resulting in a greater rotational speed for control horns having a smaller arm length.

Due to the differences in rotation resulting from the varied shapes of control horns 262, the depicted actuator system does not have a parallelogram linkage geometry. However, any errors in motion may either be negligible or accommodated by normal flexion of linkage bar 274. In some examples, the linkage bar may comprise multiple separate sections and/or a flexible portion to accommodate greater deviations.

B. Illustrative Aircraft and Associated Method

Figure 15:
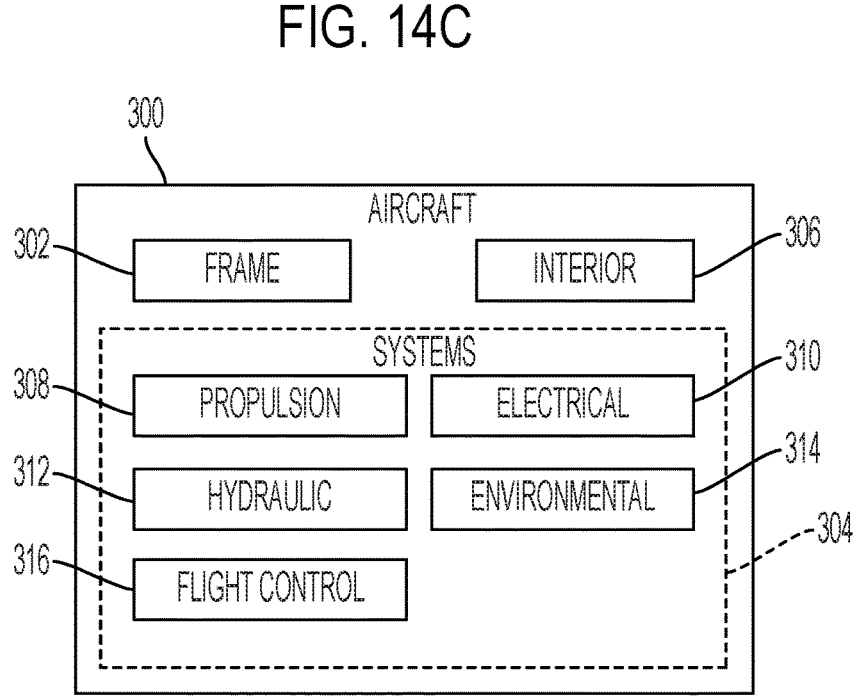
FIG. 15 is a schematic diagram of an illustrative aircraft.
Figure 16:
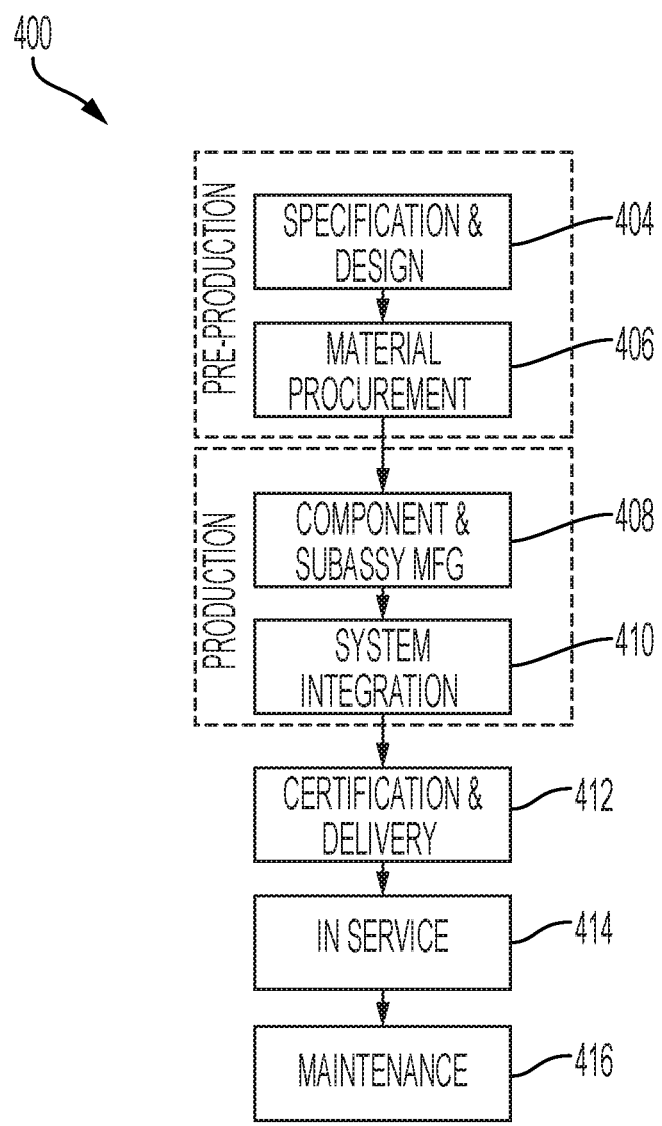
FIG. 16 is a flowchart depicting steps of an illustrative aircraft manufacturing and service method.

Examples disclosed herein may be described in the context of an illustrative aircraft 300 (see FIG. 15) and an illustrative aircraft manufacturing and service method 400 (see FIG. 16). Method 400 includes a plurality of processes, stages, or phases. During pre-production, method 400 may include a specification and design phase 404 of aircraft 300 and a material procurement phase 406. During production, a component and subassembly manufacturing phase 408 and a system integration phase 410 of aircraft 300 may take place. Thereafter, aircraft 300 may go through a certification and delivery phase 412 to be placed into in-service phase 414. While in service (e.g., by an operator), aircraft 300 may be scheduled for routine maintenance and service phase 416 (which may also include modification, reconfiguration, refurbishment, and so on of one or more systems of aircraft 300). While the examples described herein relate generally to operational use during in-service phase 414 of aircraft 300, they may be practiced at other stages of method 400.

Each of the processes of method 400 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 15, aircraft 300 produced by illustrative method 400 may include a frame 302 with a plurality of systems 304 and an interior 306. Examples of plurality of systems 304 include one or more of a propulsion system 308, an electrical system 310, a hydraulic system 312, an environmental system 314, and a flight control system 316. Each system may comprise various subsystems, such as controllers, processors, actuators, effectors, motors, generators, etc., depending on the functionality involved. Any number of other systems may be included. Although an aerospace example is shown, the principles disclosed herein may be applied to other industries, such as the automotive industry, rail transport industry, and nautical engineering industry. Accordingly, in addition to aircraft 300, the principles disclosed herein may apply to other vehicles, e.g., land vehicles, marine vehicles, etc.

Apparatus and methods shown or described herein may be employed during any one or more of the stages of the aircraft manufacturing and service method 400. For example, components or subassemblies corresponding to component and subassembly manufacturing phase 408 may be fabricated or manufactured in a manner similar to components or subassemblies produced while aircraft 300 is operating during in-service phase 414. Also, one or more examples of the apparatus, methods, or combinations thereof may be utilized during manufacturing phase 408 and system integration phase 410, for example, by substantially expediting assembly of or reducing the cost of aircraft 300. Similarly, one or more examples of the apparatus or method realizations, or a combination thereof, may be utilized, for example and without limitation, while aircraft 300 is in in-service phase 414 and/or during maintenance and service phase 416.

C. Illustrative Method

Figure 17:
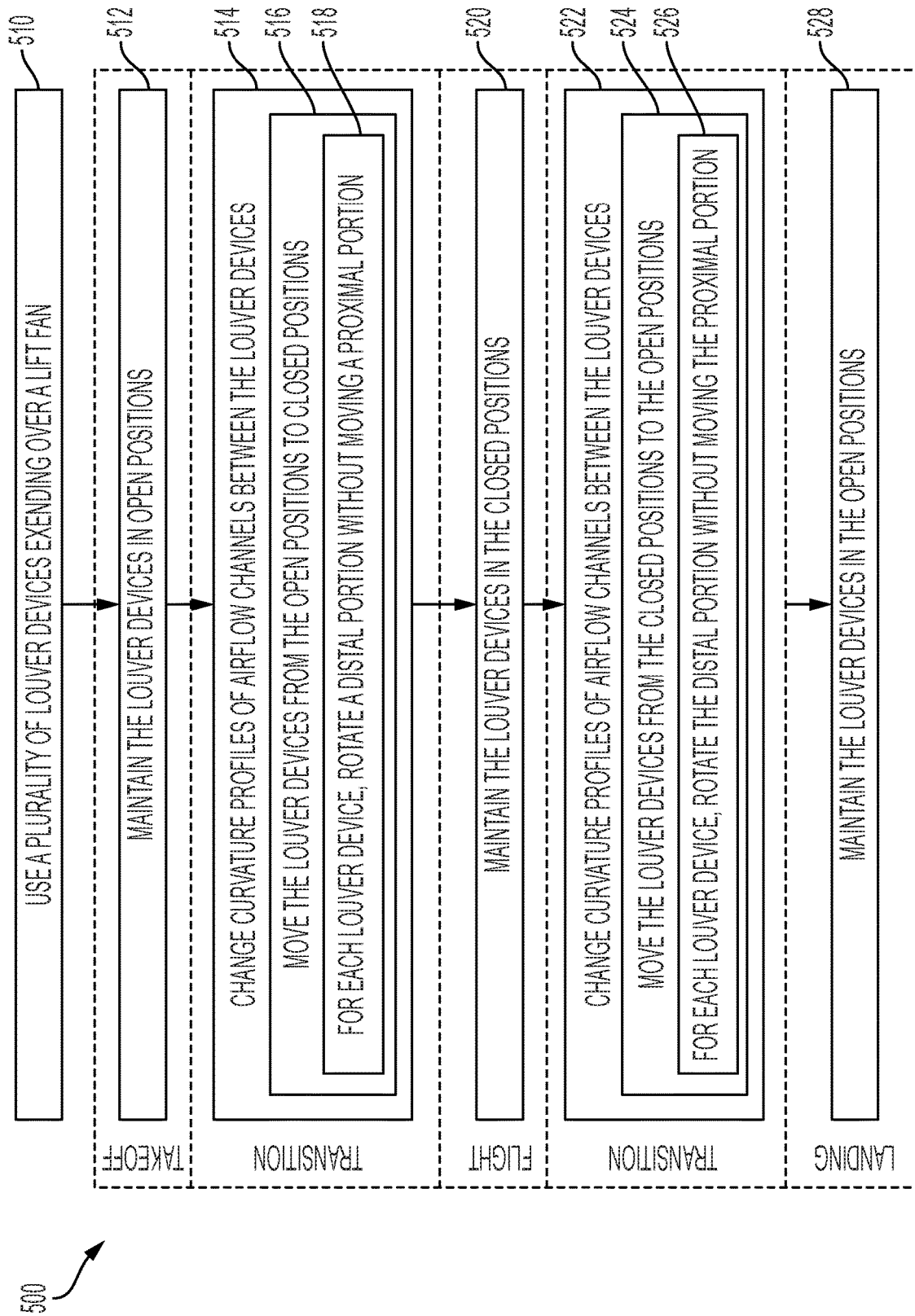
FIG. 17 is a flow chart depicting steps of an illustrative method of controlling air flow into a lift fan, according to the present teachings

This section describes steps of an illustrative method 500 of controlling air flow into a lift fan; see FIG. 17. Aspects of aircraft, fans, and/or fan covers described above may be utilized in the method steps described below. Where appropriate, reference may be made to components and systems that may be used in carrying out each step. These references are for illustration, and are not intended to limit the possible ways of carrying out any particular step of the method.

FIG. 17 is a flowchart illustrating steps performed in an illustrative method, and may not recite the complete process or all steps of the method. Although various steps of method 500 are described below and depicted in FIG. 17, the steps need not necessarily all be performed, and in some cases may be performed simultaneously or in a different order than the order shown.

At step 510, the method includes using a plurality of louver devices extending over the lift fan. The lift fan may be mounted in a duct in an airfoil, such as the wing of a VTOL aircraft. Together the louver devices may comprise a fan cover, and may be operatively linked by an actuation system. The louver devices may be positioned at an inlet opening of the duct. Each louver device may span the inlet opening, and may have an airfoil shape configured to direct airflow alternately over or into the inlet opening.

The louver devices may actuated to alter the volume of air which enters the fan duct. The louver devices may be controlled by a flight control system of the aircraft as part of flight phases such as takeoff and landing, climbing and descent, and/or cruising and maneuvering. Steps 512-528 of method 500 may each be performed according to and/or as part of a phase of flight, as indicated in FIG. 17.

Step 512 may be performed during takeoff and/or hover, and includes maintaining the louver devices in open positions. In the open positions, the louver devices may be configured to direct air from above the duct through the inlet opening into the duct. Distal portions of the louver devices may extend above the duct and surrounding airfoil surface, and each distal portion may extend at a different angle in order to entrain air from a wide range of angles. Angles of the distal portions may vary from a forward end of the duct to a rear end, and in some examples may vary linearly by approximately thirty degrees or more. A longitudinally central distal portion may be approximately vertical, while forward distal portions rotate open to less than a vertical position and rearward distal portions rotate past the vertical position.

Step 514 may be performed during transition from hover to horizontal flight, and includes changing curvature profiles of airflow channels between the louver devices. The airflow channels may be defined between adjacent louver devices, and may extend from above the inlet opening of the duct down into the duct. As the aircraft transitions between hover and horizontal flight, incoming airflow may be generated by horizontal acceleration as well as vertical suction of the fan, and the angle of incoming airflow at the duct may change. The curvature profiles of the airflow channels may be changed to match the changing angle of incoming airflow and effectively turn the air in order to maintain airflow into the lift fan.

More specifically, sub-step 516 includes moving the louver devices from open positions to closed positions. Moving the louver devices may change the shape of the airflow channels between the louver devices. Closing the louver devices may be described as decreasing a radius of curvature of the airflow channels, increasing a deviation of the airflow channels from a straight angle, and/or introducing an increasingly sharp turn into the airflow channels.

The louver devices may be closed according to sub-step 518, which includes rotating a distal portion of each louver device without moving a proximal portion. The distal portion may be rotated relative to the proximal portion, around a pivotable connection such as one or more hinges. The distal portion may be rotated such that a leading edge of the distal portion remains at approximately a zero angle of attack to the incoming airflow as the incoming airflow changes, or at least such that an angle of attack between positive and negative 10 degrees is maintained.

The distal portions of the louver devices may be rotated through a limited angular range, from an orientation selected to maximize air entrainment in the open position to a near-horizontal orientation in the closed position. Each distal portion may rotate through a different angular range, and may rotate at a different angular rate. In the present example the angular ranges may be between approximately 70 and 110 degrees. In some examples, the angular ranges may be between approximately 50 and 130 degrees. The proximal portions may remain at a fixed angle relative to the lift fan throughout transition.

The distal portions may be rotated at a constant rate from the open position to the closed position, may be rotated in stages, and/or may be rotated in any manner consistent with desired flight control. For example, the aircraft may transition directly from hover to horizontal flight modes, or the aircraft may operate for an extended period in the transitional mode.

Step 520 may be performed during horizontal or wingborne flight, and includes maintaining the louver devices in the closed positions. In flight, the lift fan may be off and incoming airflow may result only from horizontal acceleration. In the closed positions, the louver devices may be configured to direct the incoming airflow over the airfoil surface and exclude the incoming airflow from the inlet opening of the duct. Distal portions of the louver devices may lie approximately flush with the airfoil surface, and substantially cover the inlet opening of the duct.

Step 522 may be performed during transition from horizontal flight to hover, and includes changing curvature profiles of the airflow channels between the louver devices. As the aircraft transitions between horizontal flight and hover, incoming airflow may be generated vertical suction of the fan as well as by horizontal acceleration, and the angle of incoming airflow at the duct may change. The curvature profiles of the airflow channels may be changed to allow air into the inlet opening to supply the lift fan, and to match the changing angle of the incoming airflow.

More specifically, sub-step 524 includes moving the louver devices from the closed positions to the open positions. Moving the louver devices may change the shape of the airflow channels between the louver devices. Opening the louver devices may be described as increasing a radius of curvature of the airflow channels, decreasing a deviation of the airflow channels from a straight angle, and/or reducing the sharpness of the turn in the airflow channels.

The louver devices may be opened according to sub-step 526, which includes rotating the distal portion of each louver device without moving the proximal portion. The distal portions may be rotated similarly to sub-step 518, but in an opposite direction.

Step 528 may be performed during hover and/or landing, and includes maintaining the louver devices in the open positions. The open positions of the louver devices may be the same as maintained in step 514 during takeoff. Method 500 may be repeated, and/or any of steps 514-528 performed as needed during operation of the aircraft to effectively control airflow into the lift fan.

Illustrative Combinations and Additional Examples

This section describes additional aspects and features of fans, fan covers, and aircraft, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A fan apparatus, comprising:
a duct having an inlet opening,
a fan mounted in the duct,
a plurality of louver devices positioned at the inlet opening, each louver device having an open position and a closed position, wherein adjacent louver devices define a plurality of airflow channels, each airflow channel having a curvature profile that changes as the louver devices move between open and closed positions.

A1. The fan apparatus of A0, wherein the average radius of curvature of each airflow channel increases as the louver devices move from closed to open positions.

A2. The fan apparatus of A0 or A1, wherein each airflow channel has a first portion proximal to the fan, and a second portion distal from the fan, the first portion of the airflow channel remaining fixed relative to the fan as the louver devices move between open and closed positions.

A3. The fan apparatus of A2, wherein the fan has blades rotating in a plane perpendicular to a rotational axis, the first portion of each airflow channel directing airflow in a direction substantially perpendicular to the plane.

A4. The fan apparatus of any of A0-A3, wherein each airflow channel turns incoming air to a decreasing extent as the louver devices move from closed to open positions.

A5. The fan apparatus of any of A0-A4, wherein each louver device has a distal edge portion that points toward a flow of air approaching the duct, the distal edge portion being adjustable to maintain an angle of attack between positive and negative ten degrees.

A6. The fan apparatus of any of A0-A5, wherein each louver device has a fixed louver portion proximal the fan that stays in a fixed position relative to the duct and the fan, and a moveable louver portion distal the fan.

A7. The fan apparatus of A6, wherein each moveable louver portion is hinged to the respective fixed louver portion.

A8. The fan apparatus of A6 or A7, wherein each moveable louver portion in the plurality of louver devices has a limited range of rotational movement between approximately 80 degrees to 110 degrees relative to the respective fixed louver portion.

A9. The fan apparatus of any of A6-A8, wherein each moveable louver portion has a rotational axis, the louver devices being configured for installation in an aircraft wherein the rotational axis of each moveable louver portion is substantially perpendicular to a forward flight direction of the aircraft.

A10. The fan apparatus of any of A6-A9, wherein each moveable louver portion in the plurality of louver devices has a different limited range of rotation.

A11. The fan apparatus of any of A6-A10, wherein each movable louver portion is configured to rotate at a different rate.

A12. The fan apparatus of any of A6-A11, wherein each moveable louver portion in the plurality of louver devices is configured for installation in an aircraft at a different longitudinal position.

A13. The fan apparatus of A12, wherein the moveable louver portions in the plurality of louver devices have increasing limited ranges of rotational movement in the longitudinal direction.

A14. The fan apparatus of any of A6-A13, wherein the moveable louver portions in the plurality of louver devices are connected to an actuator member that is moveable in a longitudinal direction to drive movement of the louver devices from the open positions to the closed positions.

A15. The fan apparatus of A14, wherein the fixed louver portions in the plurality of louver devices are rigidly connected to a strut structure extending in the longitudinal direction, the actuator member being contained in the strut structure.

A16. The fan apparatus of any of A0-A15, wherein each louver device has a different airfoil shape.

A17. The fan apparatus of any of A0-A16, wherein each airflow channel has a different shape.

B0. An aircraft, comprising:
a lift fan,
an airfoil structure containing the lift fan and having an airfoil surface including a lift fan cover configured to move between an open position and a closed position when the aircraft shifts from a hover mode to a horizontal flight mode,
wherein the lift fan cover includes a plurality of louver devices, adjacent louver devices defining a plurality of airflow channels, each airflow channel having a curvature profile that changes as the lift fan cover moves between the open and closed positions.

B1. The aircraft of B0, wherein each louver device has a fixed louver portion proximal the lift fan that stays in a fixed position relative to the fan, and a moveable louver portion distal the fan.

B2. The aircraft of B1, wherein each moveable louver portion in the plurality of louver devices has a different limited range of rotation.

B3. The aircraft of B1 or B2, wherein each moveable louver portion in the plurality of louver devices is configured for installation in the aircraft at a different longitudinal position, each moveable louver portion having a greater range of rotational movement compared to upstream moveable louver portions, as the lift fan cover moves between the open and closed positions.

B4. The aircraft of any of B0-B3, each louver device having a distal edge portion pointing toward an airstream approaching the lift fan, the distal edge portion being adjustable to maintain an angle of attack between positive and negative ten degrees.

C0. A method of controlling airflow into a lift fan on an aircraft during a transition phase between horizontal flight and hover modes, comprising:
using a plurality of louver devices extending over a lift fan of an airfoil surface, and
changing curvature profiles of airflow channels between adjacent louver devices as the louver devices move between open and closed positions.

C1. The method of C0, further comprising:
rotating a distal portion of each louver device relative to a proximal portion of each louver device, without moving the proximal portion relative to the fan, during the transition phase.

C2. The method of C1, wherein rotating a distal portion of each louver device includes rotating each distal portion through a different limited range.

C3. The method of C1 or C2, further comprising maintaining the distal portion of each louver device in an open position relative to the proximal portion, while the aircraft is in the hover flight mode.

C4. The method of any of C1-C3, further comprising maintaining the distal portion of each louver device in a closed position relative to the proximal portion, while the aircraft is in the horizontal flight mode.

D0. A fan cover apparatus, comprising
a flight surface having fan duct inlet opening,
a plurality of louver devices positioned at the opening, each louver device including:
a static louver portion fixed relative to the flight surface, and
a movable louver portion rotatably mounted to the static louver portion.

D1. The fan cover apparatus of D0, wherein the flight surface has an airflow direction, and each movable louver portion is forward of the corresponding static louver portion relative to the airflow direction.

D2. The fan cover apparatus of D0 or D1, further comprising a strut member rigidly fixed to each of the static louver portions and extending over the opening.

D3. The fan cover apparatus of D2, wherein each of the static louver portions and the strut member are rigidly fixed to the flight surface at a first end and a second end.

D4. The fan cover apparatus of any of D0-D3, further comprising an actuating member, wherein each louver device further includes a cam structure fixed to the corresponding movable louver portion and rotatably linked to the actuating member.

D5. The fan cover apparatus of D4, further comprising a hollow strut member rigidly fixed to each of the static louver portions, wherein the actuating member extends through the hollow strut member.

D6. The fan cover apparatus of any of D0-D5, wherein each movable louver portion is rotatable between an open position in which the plurality of louver devices direct air into the fan duct inlet opening, and a closed position in which the plurality of louver devices direct air over the flight surface.

D7. The fan cover apparatus of D6, wherein at least two of the movable louver portions of the plurality of louver devices rotate through a different angular range from the open position to the closed position.

D8. The fan cover apparatus of D7, wherein each movable louver portion rotates through a different angular range from the open position to the closed position.

D9. The fan cover apparatus of any of D6-D8, wherein each movable louver portion rotates through a plurality of intermediate positions between the open position and the closed position, the plurality of louver devices directing air both into the fan duct inlet opening and over the flight surface in each of the intermediate positions.

D10. The fan cover apparatus of any of D0-D9, wherein the static louver portion and the movable louver portion of each louver device are mounted such that the louver device acts as a slotted airfoil.

D11. The fan cover apparatus of any of D0-D10, further comprising an aft-most movable louver portion rotatably mounted to the flight surface.

E0. A method of controlling airflow into a lift fan, comprising:
directing a flow of air over a lift fan cover including a plurality of louver devices,
translating an actuating member rotatably coupled to a plurality of cam structures,
rotating a movable louver portion of each louver device with a corresponding one of the plurality of cam structures, relative to a corresponding fixed louver portion of the respective louver device, and
re-directing the flow of air through the louver devices, toward the lift fan as the cover moves between open and closed positions.

Advantages, Features, and Benefits

The different examples of the fan cover and associated method described herein provide several advantages over known solutions for a movable louvered fan cover. For example, illustrative examples described herein close cleanly and provide powerful airflow in transitional positions.

Additionally, and among other benefits, illustrative examples described herein provide low-turbulence airflow to the fan.

Additionally, and among other benefits, illustrative examples described herein improve lift, and reduce drag and vibration during transition between flight modes in a VTOL aircraft.

Additionally, and among other benefits, illustrative examples described herein reduce or eliminate actuator loading, allowing use of a light-weight and inexpensive actuator system.

Additionally, and among other benefits, illustrative examples described herein use a simple, strong, and light-weight hinge mechanism.

Additionally, and among other benefits, illustrative examples described herein allow structural loads associated with turning airflow to be carried by a fixed structure.

Additionally, and among other benefits, illustrative examples described herein use a slotted airfoil shape for improved flow dynamics.

No known system or device can perform these functions, particularly in flight conditions. Thus, the illustrative examples described herein are particularly useful for wing-embedded fans of VTOL aircraft. However, not all examples described herein provide the same advantages or the same degree of advantage.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A fan apparatus, comprising:
a duct having an inlet opening,
a fan mounted in the duct, and
a plurality of louver devices positioned at the inlet opening, each louver device having an open position and a closed position, wherein each louver device includes a moveable louver portion rotatable relative to the inlet opening and a control horn fixed to the moveable louver portion, and
a linkage bar, each control horn being rotatable connected to the linkage bar,
wherein linear motion of the linkage bar is translated to rotation of the movable louver portions by the control horns, to transition the plurality of louver devices between the open and closed positions, and
wherein a shape of the control horn varies across the plurality of louver devices, and the angular range of rotation of each moveable louver portion varies between louver devices depending on the shape of the corresponding control horn.

2. The fan apparatus of claim 1, wherein:
adjacent louver devices define a plurality of airflow channels, each airflow channel having a curvature profile that changes as the plurality of louver devices move between the open and closed positions,
each airflow channel has a first portion proximal to the fan, and a second portion distal from the fan, the first portion of said airflow channel remaining fixed relative to the fan as the plurality of louver devices move between the open and closed positions, and
the fan has blades rotating in a plane perpendicular to a rotational axis, the first portion of each airflow channel directing airflow in a direction perpendicular to the plane.

3. The fan apparatus of claim 1, wherein each louver device has a distal edge portion that points toward a flow of air approaching the duct, the distal edge portion being adjustable to maintain an angle of attack between positive and negative ten degrees.

4. The fan apparatus of claim 1, wherein each louver device has a fixed louver portion proximal to the fan that stays in a fixed position relative to the duct and the fan, and the moveable louver portion is distal from the fan.

5. The fan apparatus of claim 4, wherein each moveable louver portion of the plurality of louver devices is hinged to the respective fixed louver portion.

6. The fan apparatus of claim 4, wherein each louver device has a different airfoil shape.

7. The fan apparatus of claim 4, further including an actuator member connected to the plurality of louver devices that is moveable in a longitudinal direction to drive movement of the plurality of louver devices between the open and closed positions.

8. The fan apparatus of claim 7, wherein each fixed louver portion of the plurality of louver devices is rigidly connected to a strut structure extending in the longitudinal direction, the actuator member being contained in the strut structure.

9. The fan apparatus of claim 1, wherein each control horn has a curved shape.

10. The fan apparatus of claim 9, wherein each control horn includes a head portion and a tail portion connected by an arm portion, the length of the arm portion varying across the plurality of louver devices.

11. The fan apparatus of claim 10, wherein the tail portion of each control horn is received in a slot of a fixed portion of the respective louver device.

12. The fan apparatus of claim 1, wherein the plurality of louver devices is moved between the open position and the closed position by a single actuator.

13. The fan apparatus of claim 1, wherein the difference between the angular ranges of rotation of the moveable louver portions is determined by the difference in shapes of the control horns.

14. The fan apparatus of claim 1, wherein each moveable louver portion has a greater angular range of rotational movement between the open position and the closed position compared to upstream moveable louver portions.

15. The fan apparatus of claim 1, wherein, in each louver device:

the control horn has a first end fixed to the moveable louver portion and a second end rotatably connected to the linkage bar, the moveable louver portion and control horn are rotatable relative to the inlet opening, around a hinge, the first end of the control horn is restrained from linear movement by the hinge, the control horn is rotated around the hinge by linear movement of the linkage bar, and the moveable louver portion is rotated between the open and closed positions by rotation of the control horn.

16. An aircraft, comprising:

a lift fan mounted in a duct, an airfoil structure containing the lift fan and having an upper airfoil surface including a lift fan intake cover having a plurality of louver devices configured to move between an open position and a closed position when the aircraft transitions from a hover mode to a horizontal flight mode, wherein:

a moveable portion of each louver device has an airfoil shape, the airfoil shape varying between louver devices along a longitudinal axis of the duct, the longitudinal axis coincides with a relative wind direction when the aircraft is in the horizontal flight mode, the plurality of louver devices is moved between the open position and the closed position by a single actuator, the actuator is connected to a linkage bar, and the linkage bar is pivotably connected to each louver device, the linkage bar is connected to a control horn of each louver device, each control horn is fixed to the corresponding moveable louver portion, a shape of the control horn varies across the plurality of louver devices, the angular range of rotational movement between the open position and the closed position of each louver device depends on the shape of the respective control horn, and each moveable louver portion has a greater angular range of rotational movement between the open position and the closed position compared to upstream moveable louver portions.

17. The aircraft of claim 16, wherein each louver device has a fixed louver portion proximal to the lift fan that stays in a fixed position relative to the lift fan, and the moveable louver portion is distal from the lift fan.

18. The aircraft of claim 16, wherein, each control horn has a curved shape and includes a head portion and a tail portion connected by an arm portion, the variation of shape between the control horns is a variation in a length of the arm portion, and the difference between the angular ranges of rotation of the moveable louver portions is determined by the difference in the lengths of the arm portions.

19. A method of controlling airflow into a lift fan on an aircraft during a transition phase between a hover mode and a horizontal flight mode, comprising:

using a plurality of louver devices extending over a lift fan of an airfoil surface to direct airflow, and rotating a distal portion of each louver device between open and closed positions, including rotating each distal portion through a different angular range of rotation by translating linear motion of a linkage bar to rotational motion with a control horn of each louver device, wherein a shape of the control horn varies between louver devices along the fore-to-aft direction of the aircraft, and the angular range and rate of rotation of each distal portion varies between louver devices depending on the shape of the corresponding control horn.

\* \* \* \* \*

UNITED STATES PATENT AND TRADEMARK OFFICE
CERTIFICATE OF CORRECTION

| | | |
|---|---|---|
| PATENT NO. | : 11,993,361 B2 | |
| APPLICATION NO. | : 16/878529 | |
| DATED | : May 28, 2024 | |
| INVENTOR(S) | : Robert William Parks | |

It is certified that error appears in the above-identified patent and that said Letters Patent is hereby corrected as shown below:

In the Claims

In Claim 1, Column 19: Line 64, the word "rotatable" should be changed to --rotatably--.

Signed and Sealed this
Sixteenth Day of July, 2024

Katherine Kelly Vidal
*Director of the United States Patent and Trademark Office*